HENRY W. HAMILTON.
Hay Loader.

No. 121,777. Patented Dec. 12, 1871.

Witnesses:
John Becker.
Francis McArdle.

Inventor:
H. W. Hamilton
Per Munn & Co.
Attorneys.

UNITED STATES PATENT OFFICE.

HENRY W. HAMILTON, OF BRANDON, VERMONT.

IMPROVEMENT IN HAY-LOADERS.

Specification forming part of Letters Patent No. 121,777, dated December 12, 1871.

*To all whom it may concern:*

Be it known that I, HENRY W. HAMILTON, of Brandon, in the county of Rutland and State of Vermont, have invented a new and useful Improvement in Combined Hay-Rake and Loader; and I do hereby declare that the following is a full, clear, and exact description thereof, which will enable others skilled in the art to make and use the same, reference being had to the accompanying drawing forming part of this specification, in which—

Figure 1:
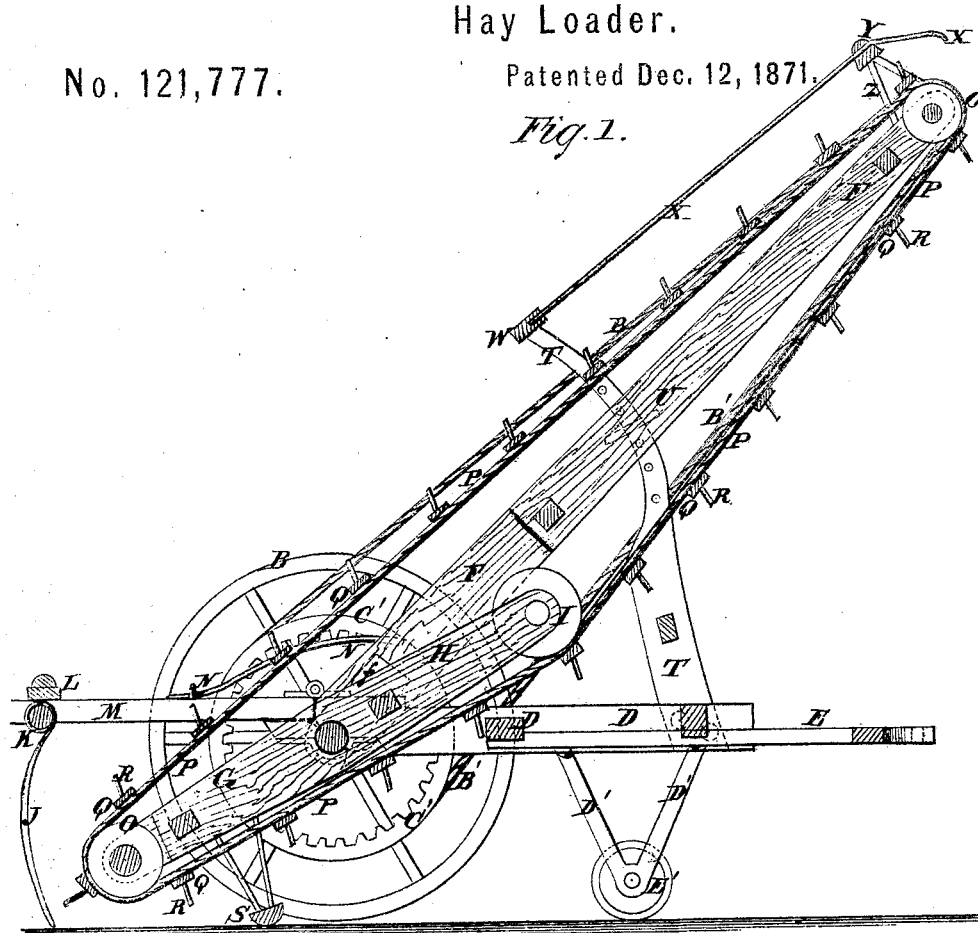
Figure 2:
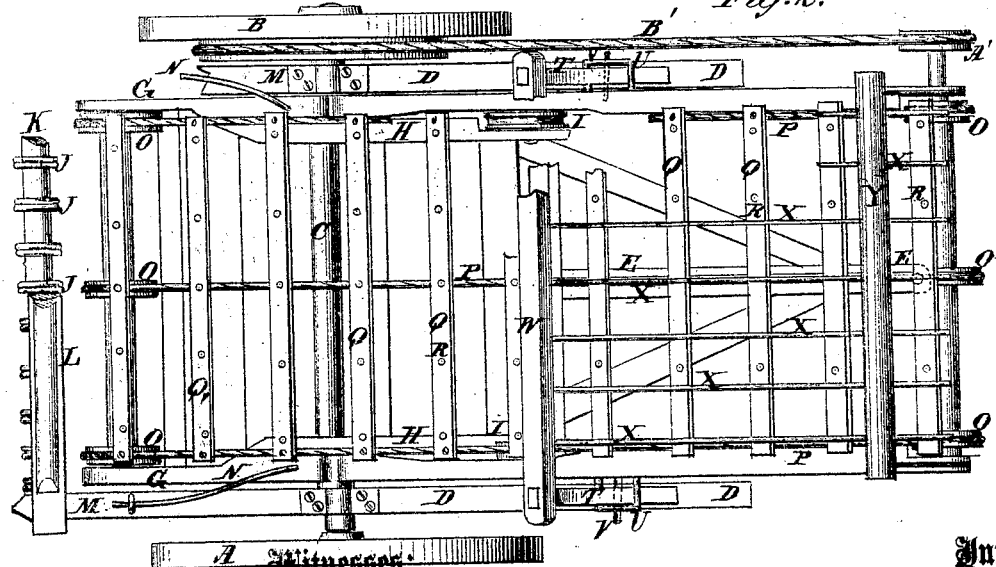

Figure 1 is a vertical longitudinal section of my improved machine. Fig. 2 is a top view of the same, parts being broken away to show the construction.

Similar letters of reference indicate corresponding parts.

My invention has for its object to furnish an improved machine by means of which the hay may be gathered and loaded upon a wagon as the wagon is drawn through the field, and which shall be simple in construction and effective in operation; and it consists in the construction and combination of various parts of the machine, as hereinafter more fully described and pointed out in the claims.

A B are the drive-wheels, which run loosely upon the axle C. To the axle C is attached the frame D, to which is attached the reach E, by means of which the machine is connected with the rear part of the wagon upon which the hay is to be loaded. F is the upper part of the elevator-frame, the lower ends of the side bars of which are notched to ride upon the axle C, where they are secured in place by plates $f'$, attached to their sides, and through holes in the lower part of which the axle C passes. G is the lower part of the elevator-frame, the upper ends of which are notched to fit upon the lower rear side of the axle C, against which they are held by the frame H, the lower ends of the side bars of which are rigidly attached to the sides of the upper ends of the side bars of the said frame G, and through holes in which the axle C passes. To the upper ends of the side bars of the frame H are pivoted grooved pulleys I, for the purpose hereinafter described. J are the rake-teeth, which are made of wire, and the upper parts of which are coiled around the shaft K, and their ends are attached to the cross-bar L, the ends of which are attached to the rear ends of the arms or bars M. The forward ends of the arms or bars M are hinged to the rear ends of the side bars of the frame D in such a way as to have a free vertical movement to enable them to rise to pass over obstructions, but no lateral movement, so that the rake will always be in proper relative position. The rake is held down to its work by springs N attached to the upper part F of the elevator-frame, and which rest upon the upper sides of the bars M, as shown in Figs. 1 and 2. To the upper ends of the side bars of the upper part F, and the lower ends of the side bars of the lower part G of the elevator-frame, are pivoted shafts or rollers having three or more grooved pulleys, O, attached to them, around which pass the endless ropes or chains P of the elevator. To the ropes or chains P are attached cross-bars Q, to which, at suitable distances apart, are attached teeth or fingers R, by which the hay collected by the rake is taken from the said rake, carried up, and discharged upon the wagon. To the lower parts of the side bars of the lower part G of the elevator-frame are attached shoes or wheels S to keep the lower part of the elevator-frame from coming in contact with the ground, and to cause it to conform to the irregularities of the surface of the ground. The side bars of the frame G are made longer than the side bars of the frame H, so that the lower end of the elevator may be held down to its place by its own weight. The wheels or pulleys I, pivoted to the upper ends of the side bars of the frame H, rest upon the chains or ropes P of the elevator and keep them taut, however the elevator may be adjusted. The upper part F of the elevator-frame is adjustably supported by arms T, the lower ends of which are rigidly attached to the forward parts of the side bars of the frame D, and the upper parts of which pass through keepers U attached to the side bars of the frame F. The arms T have several holes formed through them to receive pins V, so that, by changing the position of said pins, the upper part of the elevator may be adjusted as required. The upper ends of the arms T are connected by a cross-bar W, to which are attached the lower ends of the wires or rods X, which pass through the cross-bar Y connected with the upper ends of the side bars of the upper part F of the elevator-frame by brackets Z. The projecting upper ends of the rods or wires X are curved downward. The rods or wires X thus serve as a guard to keep the hay in place upon the elevator while being raised and discharged upon the wagon. To the end of one of the shafts that carry the elevator is attached a pulley, A', around which passes a rope or chain, B', which also passes around the pulley C' attached to or formed upon one of the drive-wheels, as B.

If desired, the elevator may be driven from said drive-wheel by means of toothed gear-wheels, as indicated by the gear-wheel C' attached to said drive-wheel.

D' is a bracket attached to the middle forward part of the frame D, and to which is pivoted a wheel, E'. The wheel D' E' is designed to support the forward part of the machine when detached from the wagon, the bracket D' being made of such a length that the wheel E' will not touch the ground when the machine is in use.

Having thus described my invention, what I claim as new, and desire to secure by Letters Patent, is—

1. The arms or frame H, provided with pulleys I, in combination with the two parts G F of the elevator-frame and with the elevator P Q R, substantially as herein shown and described, and for the purpose set forth.

2. The elevator-frame, made in two parts, F G, and pivoted to the axle C at their adjacent ends to enable the lower end of the elevator to adjust itself to the surface of the ground, substantially as herein shown and described, and for the purpose set forth.

3. The combination of the short frame G, supported upon shoe S, with the arms M, teeth J, spring N, frame H, elevator P Q R, and frame D, as shown and described.

H. W. HAMILTON.

Witnesses:
  STEPHEN SALLE,
  GEO. BRIGGS.

(77)